(12) United States Patent
Raskar et al.

(10) Patent No.: US 7,103,227 B2
(45) Date of Patent: Sep. 5, 2006

(54) ENHANCING LOW QUALITY IMAGES OF NATURALLY ILLUMINATED SCENES

(75) Inventors: Ramesh Raskar, Cambridge, MA (US);
Adrian Ilie, Chapel Hill, NC (US);
Jingi Yu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 762 days.

(21) Appl. No.: 10/392,429

(22) Filed: Mar. 19, 2003

(65) Prior Publication Data

US 2004/0184667 A1 Sep. 23, 2004

(51) Int. Cl.
*G06K 9/40* (2006.01)
*G06K 9/68* (2006.01)
*G06K 9/00* (2006.01)

(52) U.S. Cl. ..................... 382/266; 382/220

(58) Field of Classification Search ............ 382/108, 382/190, 199, 219, 220, 254, 256, 266, 274, 382/275, 284; 358/504, 509, 475, 520; 359/28, 385, 389, 390; 356/66; 345/582, 345/617, 632; 348/239, 371
See application file for complete search history.

(56) References Cited

U.S. PATENT DOCUMENTS

| | | | | |
|---|---|---|---|---|
| 4,771,470 | A * | 9/1988 | Geiser et al. | 382/266 |
| 6,108,453 | A * | 8/2000 | Acharya | 382/254 |
| 6,373,992 | B1 * | 4/2002 | Nagao | 382/266 |
| 6,771,838 | B1 * | 8/2004 | Fan | 382/274 |
| 6,891,549 | B1 * | 5/2005 | Gold | 345/611 |
| 7,050,646 | B1 * | 5/2006 | Xu et al. | 382/254 |
| 2003/0118246 | A1 * | 6/2003 | August | 382/260 |
| 2004/0042676 | A1 * | 3/2004 | Srinivasa | 382/254 |
| 2004/0183812 | A1 * | 9/2004 | Raskar et al. | 345/582 |
| 2004/0183925 | A1 * | 9/2004 | Raskar et al. | 348/239 |
| 2004/0183940 | A1 * | 9/2004 | Raskar | 348/371 |
| 2004/0184667 | A1 * | 9/2004 | Raskar et al. | 382/254 |
| 2004/0184677 | A1 * | 9/2004 | Raskar et al. | 382/284 |

OTHER PUBLICATIONS

Elder, J. 1999. Are Edges Incomplete? *International Journal of Computer Vision 34*, 2/3, 97-122.

Fattal, R., Lischinski, D., and Werman, M. 2002. Gradient Domain High Dynamic Range Compression. In *Proceedings of SIGGRAPH 2002*, ACM SIGGRAPH.

Hertzmann, A. 1988. Painterly Rendering with Curved Brush Strokes of Multiple Sizes. In *Proceeding of SIGGRAPH '98* (Orlando, Jul. 1998), M. Cohen, Ed., Computer Graphics Proceedings, Annual Conferences Series, ACM SIGGRAPH, 453-460.

Hertzmann, A. 1999. Introduction to 3D Non-Photorealistic Rendering: Sihouettes and Outlines. In *SIGGRAPH '99 Course Notes. Course on Non-Photorealistic Rendering*, S. Green. Ed. New York, ch. 7.

Kowalski, M.A., Markosian, L., Northrup, J. D., Bourdev, L., Barzel, R., Holden, L. S., and hughes, J. F. 1999. Art-Based Rendering of Fur, Grass, and Trees. In *Proceeding of SIGGRAPH '99* (Los Angeles, Aug. 1999), Computer Graphics Proceedings, Annual Conference Series, ACM SIGGRAPH, 433-438.

(Continued)

*Primary Examiner*—Amir Alavi
(74) *Attorney, Agent, or Firm*—Dirk Brinkman; Andrew J. Curtin

(57) ABSTRACT

A method enhances images of a naturally illuminated scene. First, a set of images $I_i(x, y)$ is acquired of a scene. Each image is acquired under a different uncontrolled illumination. For each image $I_i(x, y)$, intensity gradients $\nabla I_i(x, y)$ are determined, and each image is weighted with weights according to the intensity gradients. The weighted images are then combined to construct an enhanced image I'.

26 Claims, 9 Drawing Sheets

OTHER PUBLICATIONS

Markosian, L., Kowalski, M. A., Trychin, S. J., Bourdev, L. D., Goldstein, D., and Hughes, J.F. 1997. Real-Time Nonphotorealistic Rendering. In *Proceeding of SIGGRAPH '97* (Los Angeles, Aug. 1997), T. Whitted, Ed., Computer Graphics Proceedings, Annual Conference Series, ACM SIGGRAPH, 415-420.

Ostromoukhov, V. 1999. Digital facial engraving. In *Proceeding of SIGGRAPH '99*, A. Rockwood, Ed., ACM SIGGRAPH, 417-424.

Reinhard, E., Stark, M., Shirley, P., and Ferwerda, J. 2002. Photographic Tone Reproduction for Images. In *Proceedings of SIGGRAPH 2002*, ACM SIGGRAPH.

Savarese, S., Rushmeier, H., Bernardini, F., and Perona, P. 2001. Shadow Carving. In *Proc. of the Int. Conf. on Computer Vision*.

Toyama, K., Krumm, J., Brumitt, B., and Meyers, B. 1999. Wallflower: Principles and Practice of Background Maintenance. In *ICCV* (1), 255-261.

Zickler, T., Belhumeur, P. N., and J., K. D. 2002. Helmotz. Stereopsis: Exploiting Reciprocity for Surface Reconstruction. In *ECCV*.

\* cited by examiner

ENHANCING LOW QUALITY IMAGES OF NATURALLY ILLUMINATED SCENES

FIELD OF THE INVENTION

The invention relates generally to rendering non-photorealistic images, and more particularly to generating non-photorealistic images from images acquired of natural scenes.

BACKGROUND OF THE INVENTION

Conventional cameras are excellent for capturing realism in scenes. However, conventional images are frequently insufficient for many applications where instead of physical realism, altered images are desired. The alteration can enhance some details, while de-emphasizing other details.

Therefore, many modern digital cameras perform image processing, such as non-linear color mapping, edge sharpening, or saturating blue shades in images of outdoor scenes to make water or sky look more lively, while still maintaining near-photorealistic appearance.

Similarly, a photographer can illuminate a scene with soft, side or back lighting to selectively add contrast to the scene. In addition, images can be retouched using a photo-editor that applies various image filters and enhancers.

Besides being aesthetically pleasing, enhanced and reduced complexity images are also useful for highlighting or clarifying selected features in technical illustrations, or high-quality thumbnail images. With a few exceptions, available techniques for image enhancement, image abstraction or image stylization involve capturing and processing a single image as the input, see DeCarlo et al., "Stylization and Abstraction of Photographs," *Proceedings of Siggraph* '02, ACM Press, 2002, and Hertzmann, "Painterly Rendering with Curved Brush Strokes of Multiple Sizes," *Proceedings of Siggraph* '98, ACM Press, 1998.

Even with state-of-the-art passive and active image processing techniques, it is still difficult to acquire accurate depth, normal and shape information. It is also difficult to generate novel views of a scene from acquired images.

In computer graphics, one approach hides these problems by using high quality images. Texture mapping can 'hide' low quality in range images, and light fields enable data-dense views instead of relying on data representation.

At the same time, digital cameras continue to evolve at a rapid pace. Advancements include higher pixel resolutions, more bits per pixel to increase the dynamic range, higher frame rates, and the ability to take multiple pictures with different lengths of exposure and wavelength, e.g., infrared.

Non-photorealistic images (NPR) intentionally appear different from photographs. NPR images can be classified broadly as artistic or utilitarian, e.g., technical illustrations. NPR images can emphasize important features such as object edges. Moving parts can be shown in different colors, and less important details such as shadows and other 'clutter' can be reduced or eliminated. Furthermore, NPR images can decouple image resolution from contained information.

The input for stylized image generation can be 3D geometric representations or images, see Markosian et al., "Real-Time Nonphotorealistic Rendering," *Proceedings of Siggraph* '97, Whitted, Ed., Computer Graphics Proceedings, Annual Conference Series, ACM SIGGRAPH, pp. 415–420, 1997, Gooch et al., "Using Non-Photorealistic Rendering to Communicate Shape," *Siggraph* '99 *Course Notes, Course on Non-Photorealistic Rendering*, Green, Ed. Ch. 8., 1999, Hertzmann, "Introduction to 3D Non-Photorealistic Rendering: Silhouettes and Outlines," *Siggraph* '99 *Course Notes on Non-Photorealistic Rendering*, Green, Ed. New York, Ch. 7, 1999, and Kowalski, "Art-Based Rendering of Fur, Grass, and Trees," *Proceedings of Siggraph* '99, Computer Graphics Proceedings, Annual Conference Series, ACM SIGGRAPH, pp. 433–438, 1999.

Prior art techniques for generating stylized images from a single image have involved morphological operations, image segmentation, edge detection and color assignment. However, those techniques are limited by their dependence on a single input image. Some of techniques aim for stylized depiction, see Ostromoukhov, "Digital facial engraving," *Proceedings of Siggraph* '99, Rockwood, Ed., ACM SIGGRAPH, pp. 417–424, 1999, while others try to enhance legibility. Interactive techniques such as rotoscoping are effective as well.

Methods to combine information from multiple images into one have been explored for various other applications. They vary from tone mapping for compression of variable-exposure high-dynamic range images, see Fattal et al., "Gradient Domain High Dynamic Range Compression," *Proceedings of Sigggraph* '02, ACM SIGGRAPH, 2002, and Reinhard et al., "Photographic Tone Reproduction for Images," *Proceedings of Siggraph* '02, ACM SIGGRAPH, 2002.

Some techniques consider changing atmospheric conditions to extract 3D information and perform fog elimination, see Nayar et al., "High dynamic range imaging: Spatially varying pixel exposures," *IEEE CVPR*, 2000. Active illumination methods have been used for depth extraction and photometric stereo. Unfortunately, active illumination is unstable at depth discontinuities, which are critical for stylized rendering.

Helmholtz stereopsis attempts to overcome some of these problems, see Zickler, "Helmholtz Stereopsis: Exploiting Reciprocity for Surface Reconstruction," *ECCV,* 2002. Other active methods such as shadow carving compute a tighter hull by observing shadows, see Savarese et al., "Shadow Carving," *Proc. of the Int. Conf. on Computer Vision,* 2001.

Therefore, it is desired to provide a camera and an image rendering method that can use multiple images acquired of a scene under different illumination conditions to generate an output stylized image with enhanced or de-emphasized information.

SUMMARY OF THE INVENTION

The invention provides a camera and method for acquiring and rendering stylized images of scenes that pose problems for traditional cameras, e.g., scenes with low-contrast, geometrically complex scenes, and action scenes. The images can be still images, or a sequence of images in a video.

The camera acquires multiple images of a scene under different illumination conditions. Image features are detected by combining pixel-level information from these images. Texture details are reduced, and context is added to generate the stylized images.

The different illumination conditions can be obtained by controlled lighting, or by naturally changing illumination. When controlled lighting is used, an edge classification procedure is applied, and image reconstruction is based on a manipulation of gradients fields. With naturally varying illumination, useful information extracted from a high quality image of a scene provides context or detail for another image, perhaps with a lower quality, of the same scene.

By using different sequences of filter operations, detected features can be highlighted, and unnecessary details from multiple images can be reduced or combined in the reduced complexity output image. The resulting images are simpler and easier to understand. For example, the method can be used for illustrating complex mechanical parts, image simplification for compression, image resizing, non-photorealistic rendering, and video surveillance.

The invention extracts image features by observing changes in image brightness due to changes in illumination. The change in illumination can be controlled or uncontrolled and naturally changing. Under controlled illumination, the location of the shadows is used as a cue for detecting geometric features such as silhouette edges.

Under natural illumination, the invention relies on greater changes in the lighting, such as the sun during the day and artificial lights during the night, to merge local features and effectively enhance images by providing context.

The invention provides procedures for detecting and processing image features to deal with low-contrast scenes, geometrically complex scenes, and action scenes.

The method according to the invention provides a procedure for edge classification that separates silhouette edges from texture edges. The appearance of edges can then be enhanced based on qualitative depth information, e.g., in-front-of or behind relationships of objects in the scene.

The invention also provides a procedure for reducing detail in textured regions while preserving geometric features.

The invention can also merge multiple images while preserving useful information to improve information density in an image. Using spatial and temporal gradients can also enhance videos.

The invention also provides a self-contained stylized imaging device, that is, a non-photorealistic (NPR) camera that can directly generate NPR images of a scene.

The images or videos can be rendered in many ways, e.g., imitating artist-drawn or cartoon-like style with edge highlighting to make the image easier to understand.

The invention can also be used for other applications such as illustrating complex mechanical parts, image simplification for compression, photo-booths and video surveillance.

DETAILED DESCRIPTION OF THE PREFERRED EMBODIMENTS

NPR Camera

Figure 1A:
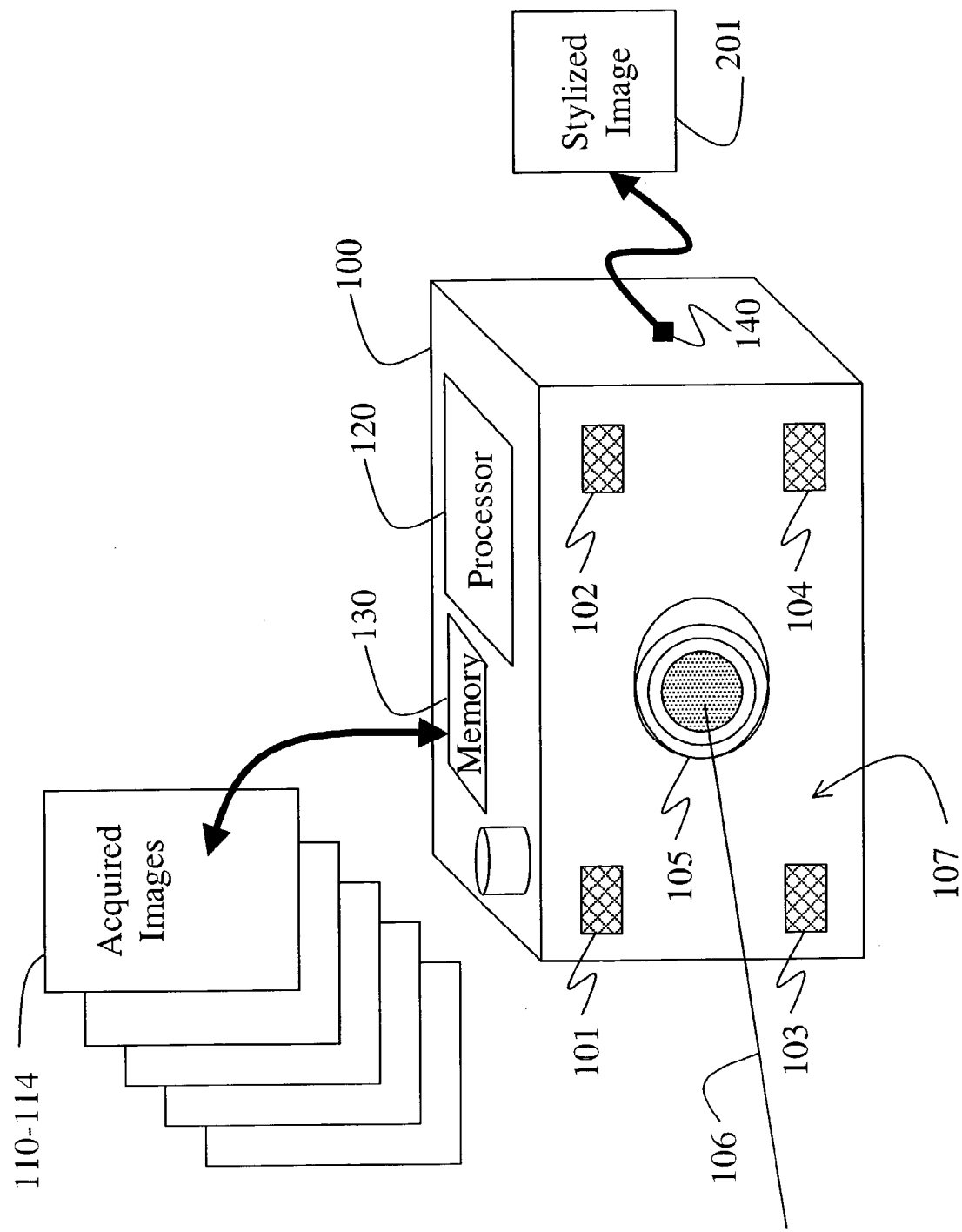
FIG. 1A is a block diagram of a non-photorealistic camera according to the invention.

FIG. 1A shows a digital camera 100 for generating non-photorealistic (NPR) images according to our invention. The camera 100 includes a plurality of flash units 101–104, and a single lens 105. The flash units 101–104 are distributed around a center of projection (COP) 106 of the lens 105. For best results, the flash units are placed as close to the COP as possible. Therefore, it makes sense to have the flash units mounted on a front surface 107 of the camera. The flash units can be distributed evenly around the COP.

Figure 1B:
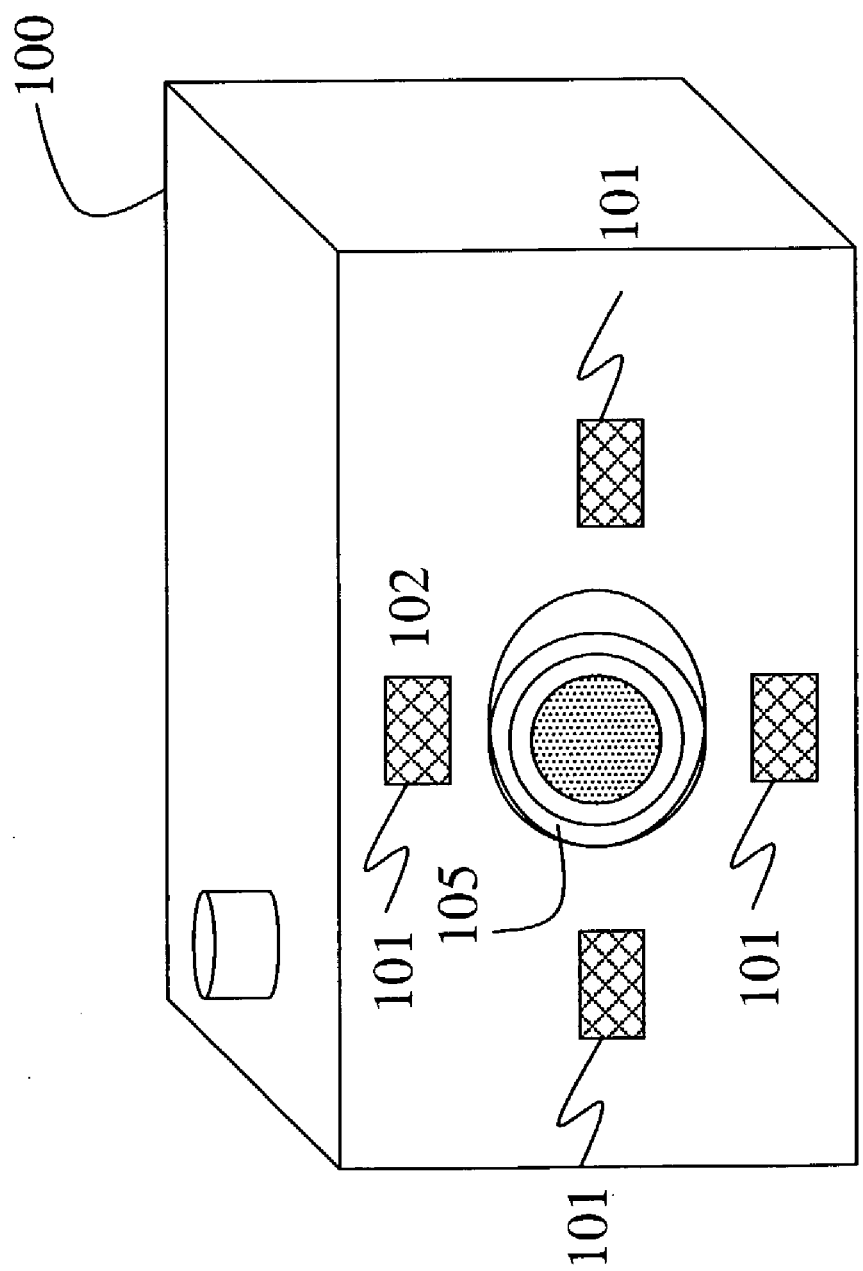
FIG. 1B is a block diagram of the camera of FIG. 1A with an alternative arrangement of flash units.

In an optimal configuration shown in FIG. 1B, the flash units 101–104 are operated in left-right and top-bottom pairs. This allows pixels in images 110–114 to be imaged for at least five lighting conditions, no shadows under ambient lighting and no flash, and bottom, top, left, and right shadows. Thus, neighboring pixels are shadowed at least in one image, and not shadowed in at least one other image.

Figure 1C:
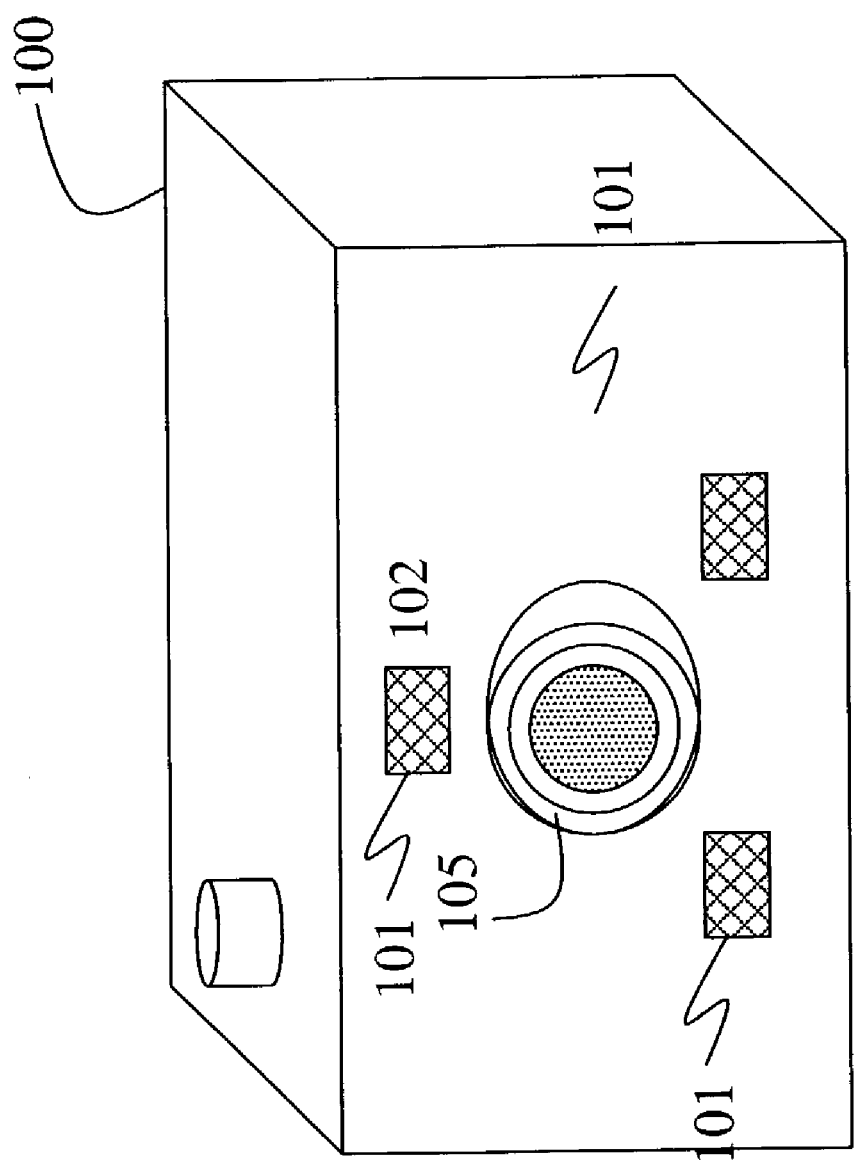
FIG. 1C is a block diagram of the camera of FIG. 1A with another alternative arrangement of flash units.

This configuration also makes an epipolar traversal efficient. For the left-right pair, the traversal can be approximated along horizontal scan lines. For the top-bottom pair, the traversal is along the vertical direction. FIG. 1C shows an arrangement with three flash units.

The flash units can be triggered by optically coupled LEDs. The LEDs are turned on in a sequence, one by one, by a microcontroller to activate the corresponding flash unit. The flash duration is about 4 milliseconds. One image is acquired while illuminating the scene with one of the flash units.

The resolution of the camera is about 4 Megapixels, although lower and higher resolutions are also possible.

As with all modern digital cameras, our camera also includes a microprocessor 120, and memory 130. The microprocessor 120 is designed to perform the operations described herein, specifically a method 200 for generating a stylized image, see FIG. 2. The memory 130 is used to store the acquired images, other intermediate images in a linearized form. The memory also stores data used by the methods and procedures described herein. The output stylized image 201 can also be stored in the memory, for later downloading, via a port 140, to an external processor for viewing.

It should be noted that the camera 100 can take multiple images in rapid succession to produce a sequence of frames or a video. These can also be stylized as described herein. It should also be noted that the images 110–114 can be acquired by using other techniques consistent with the invention, for later processing in a stand-alone processor, for example, a desk-top system or a portable computing device.

Camera Operation

Figure 2:
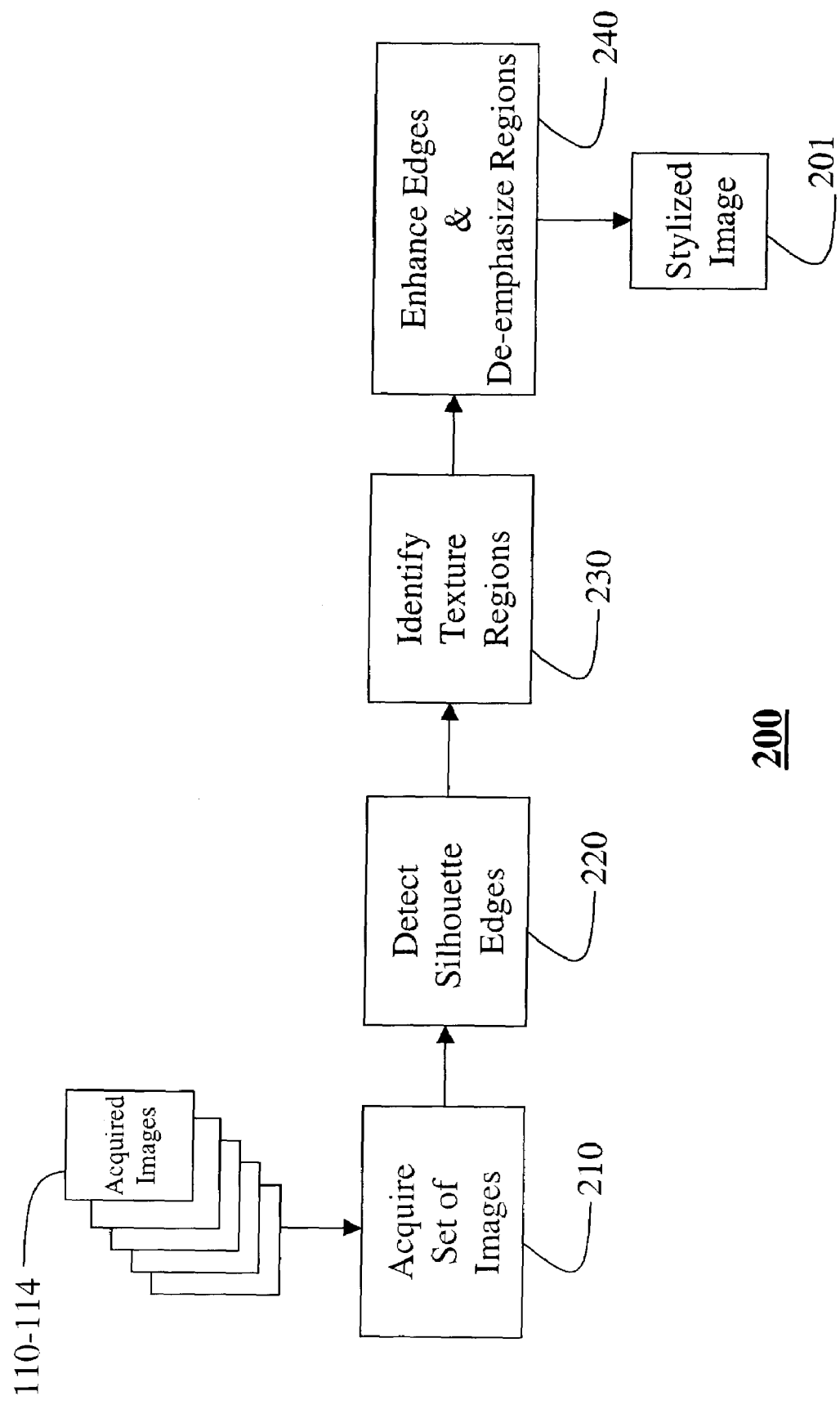
FIG. 2 is a flow diagram of a method for generating a stylized image according to the invention.

FIG. 2 shows our method 200 for generating the stylized image 201 of a scene. By stylized, we mean any non-photorealistic image with specific details such as edges enhanced, and other details such as texture and flat backgrounds reduced, abstracted or otherwise simplified as described herein.

First, the set of images 110–114 is acquired 210 by the camera 100 of FIG. 1, or some other camera and flash units that replicate the configuration shown. Each image is acquired under a different controlled lighting condition. For the configuration shown, one image is taken with ambient lighting, i.e., no flash, one with the top flash unit, one with the bottom flash unit, one with the left flash unit, and one with the right flash unit. Minimally, two flash units and three images are required, better results can be obtained with additional images and flash units, e.g., four to eight.

The set of images is processed by the microprocessor 120 to detect 220 silhouette edges, and identify 230 texture regions. Then, the silhouette edges and texture regions of a combination of the images are used to provide the stylized image 201. For example, a width of silhouette edges is made proportional to a depth discontinuity at the edges, and textured regions are de-emphasized according to color gradients.

We classify each pixel in each image as being either a silhouette edge pixel, a texture edge pixel, or a featureless pixel.

We use the term silhouette edge pixels to refer to those pixels with a C0 depth discontinuity in the scene. These include pixels that correspond to points on the surface of an object in the scene where the normal is perpendicular to a viewing direction. We also include pixels corresponding to boundaries of thin objects, e.g., a leaf or sheet of paper, and view-independent edges of objects such as a cube, both of these type of objects have depth discontinuities. Silhouette edge pixels can also belong to the interior of an object due to self-occlusion.

Texture edge pixels correspond to changes in reflectance and material discontinuities in the scene. Textured regions are typically delineated by texture edges. However, texture regions may not be completely enclosed.

Pixels in featureless regions correspond to regions in the scene with near constant reflectance and low curvature, e.g., a flat background wall. These pixels can also correspond to minor changes in appearance due to changes in the illumination or viewing direction, including anisotropic reflections on "shiny" materials such as metal and plastic.

Image Acquisition

The set of images 110–114 is acquired 210 of a scene with the flash units 101–104 placed very close to the center of projection (COP) 106 of the lens 105, see FIG. 1. Due to the small baseline between the COP and the flash units, a narrow sliver of a shadow appears near each silhouette edge in the image that presents depth discontinuities in the scene.

By combining information about attached cast shadows from two or more images with distinct lighting, we can detect the silhouette edge pixels.

Herein, an attached cast shadow is defined in an image space. This definition is quite different from the traditional shape-from-shadow definition in object space. There, the surface boundary, where a light ray is tangential to a smooth object, is considered to have attached or 'self' shadows. Here, the attached cast shadow is generated when the object and the shadow cast by the object on the background are contiguous in image space.

For most view independent edges, the shadowed areas include shadows cast on a next depth layer. For view-dependent edges, a small part of the shadow area includes self-shadows.

Generally, shadows are on the 'opposite' side of the flash units, i.e., if the flash unit is to the right of the lens, then the shadows appear to the left of the depth discontinuities in the camera image.

Detecting Silhouette Edge Pixels

Figure 3A:
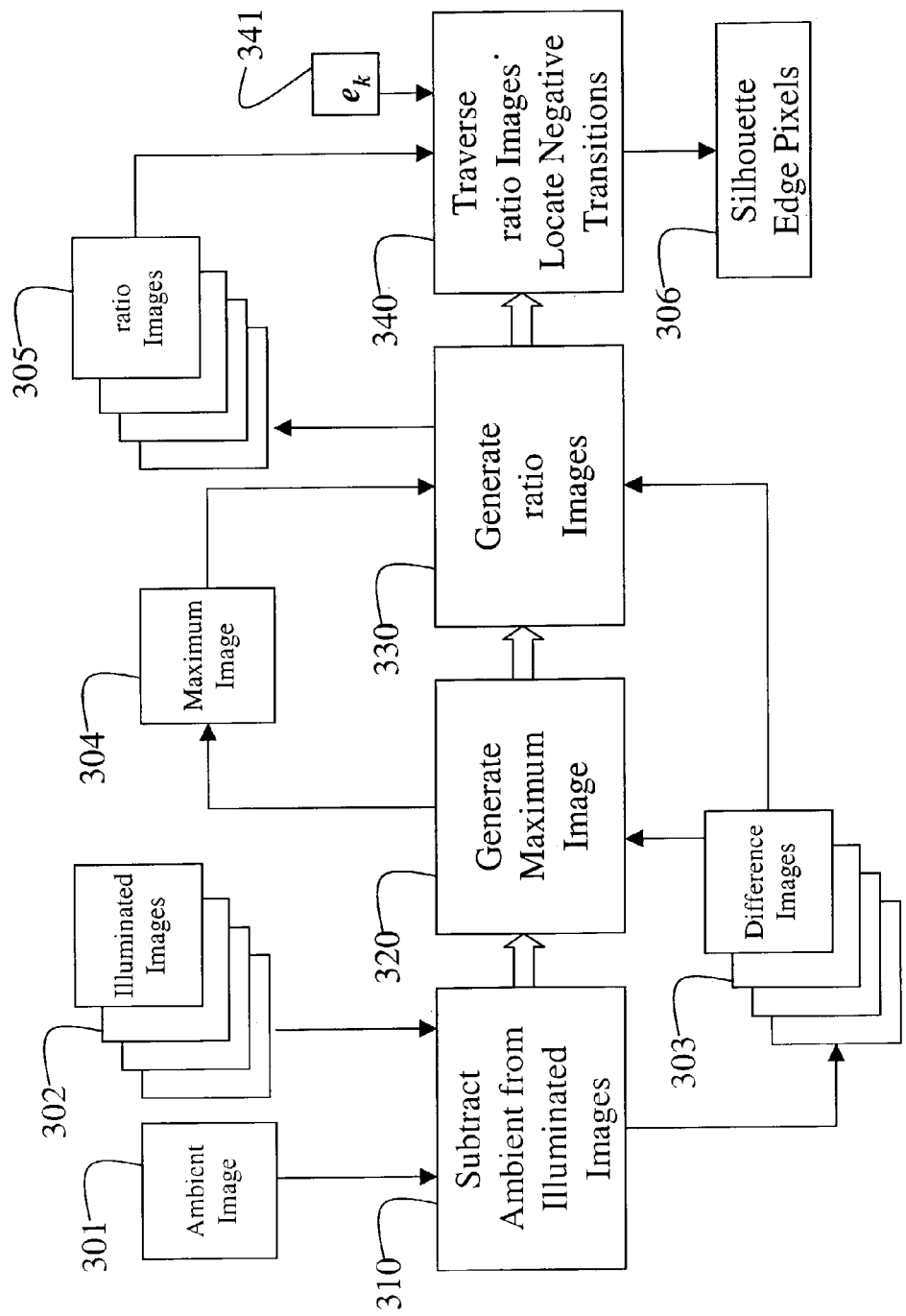
FIG. 3A is a flow diagram of a method for detecting silhouette edges.

FIG. 3A shows a procedure 300 for detecting silhouette edge pixels that is basic to our approach. The idea is surprisingly simple. Although our image acquisition process is closely related to photometric stereo, as far as we know, it has not been used in computer vision systems for detecting depth discontinuities as reflected by shadows in a scene. It allows us to classify other edges by the process of elimination.

The basic procedure 300 operates as follows.

Acquire an ambient image $I_{ambient}$ 301 of a scene, where $I_{ambient}$ is an image taken under ambient lighting without any of the flash units.

Acquire n controlled illuminated images $I'_k$ 302 of the scene, for k=1, . . . , n with a point light source, i.e., a flash unit, at position $P_k$. The images can be acquired in any order. In our example, n=4.

Difference images $I_k$ 303 are obtained by subtracting 310 the ambient image from the illuminated images, $I_k' - I_{ambient}$.

A maximum image $I_{max}$ 304 is generated 320 from difference images as $I_{max}(x) = \max_k(I_k(x))$, k=1, . . . , n. That is, each pixel in the maximum image has a maximum intensity value from any of the corresponding pixels in the difference images.

For each difference image $I_k$, generate 330 a ratio image 305 by division, for all pixels (x), $R_k(x) = I_k(x)/I_{max}(x)$. That is, each difference image is divided by the maximum image.

A pixel $e_k$ 341 in the ratio image is an epipole pixel, i.e., the epipole pixel is an image of the corresponding light source at $P_k$. Conventional stereoscopic techniques can be used to locate the epipole.

For each ratio image $R_k$ 305, traverse 340 the image while comparing pixel intensities with the pixel intensity of the epipole pixel. By radial traversal, we mean detecting intensity edges along a radial line from the epipole pixel to a given pixel. This traversal detects transitions from lighted areas to shadow areas, and vise versa.

Locate pixels y with steps with a negative intensity transition. Mark these pixel y with the negative intensity transition as a silhouette edge pixel 306. All pixels identified as silhouette pixels can be overlaid in the maximum image, so that when all images have been processed, the maximum image shows all silhouette contours.

Figure 3B:
FIG. 3B is an image of a vase of flowers with silhouette edge enhancement according to the invention.

FIG. 3B is an image 390 of a vase of flowers with silhouette edge enhancement according to the invention.

With a sufficiently large n, minimally two but typically four to eight, silhouette edge pixels at all orientation and sufficient depth difference can be detected. If the silhouette has a component perpendicular to the epipolar line, then an edge pixel with negative intensity transition from the illuminated the shadowed area is detected.

It should be understood, that for a very simple scene some silhouette edges could be detected from a single illuminated image. For example, in a scene with mostly vertical depth discontinuities, e.g., a picket fence, edges can be detected by a single side illumination.

We now describe the procedure 300 in greater detail. The $I_{max}$ image is an approximation of the image with the light source at the camera's COP 106. This approximation is close when the point light sources have the same magnitude, and a baseline between the light sources is substantially smaller than a depth of the scene. Thus, the $I_{max}$ image has no pixels in a shadow.

The ratio $(I_k/I_{max})$ is substantially close to 1 in areas illuminated by light source k, and substantially close to zero in shadowed areas. Hence, the locations of the negative intensity transitions mark the shadow edges.

An intensity at a pixel x for a 3D scene point X with diffuse reflection in the camera coordinate system, given light source at $P_k$ is given by $I_k(x)$.

If the 3D scene point X is illuminated by light source $P_k$, then $I_k(x) = \mu_k \rho_k L_k(x) \cdot N(x)$, otherwise, $I_k(x) = 0$, where value $\mu_k$ is the magnitude of the light, $\rho_k(x)$ is the reflectance at point X, $L_k(x)$ is the normalized light vector $L_k(x)=P_k-X$, and N(x) is the surface normal, all in the camera coordinate system.

Thus, when X is illuminated by the point light source $P_k$, the ratio is as follows:

$$R_k(x)=I_k(x)/I_{max}(x)=\mu_k(L_k(x)\bullet N(x))/\max_i(\mu_k(L_i(x)\bullet N(x)).$$

For diffuse objects with non-zero $\rho_k$, $R_k(x)$ is independent of the albedo $\rho_k$, and only a function of the local geometry. Furthermore, if light sources are close to camera's COP 106, and X>>P(k), then this ratio is approximately ($\mu_k/\max_i(\mu_k)$), which is a constant for a set of omni-directional light sources. Note, $R_k(x)$ is very low near silhouettes of a curved object with view dependent edges.

This is because ($L_k(x)\bullet N(x)\sim=0$), and the dot product for light sources on the opposite side is larger, i.e., ($L_i(x)\bullet N(x) > L(x)\bullet N(x)$). Thus, the intensity of pixels in the ratio image $R_k(x)$ decreases rapidly even though the pixel is not in a shadowed area. However, this is not a major issue and results in a thickening of the shadowed region and does not lead to a reversal of intensity profile along the epipolar line.

Due to secondary scattering, the ratio $R_k(x)$ is thus substantially close to zero in shadowed areas. The intensity profile along the epipolar line shows a sharp negative transition at silhouette edge as we traverse from non-shadowed foreground to shadowed background, and sharp positive transition as we traverse from shadowed to non-shadowed region on the background.

Any standard 1-D edge detector can be applied along the radial epipolar line from the epipole to a given pixel detects both these transitions, and we mark pixels with the negative transition as a silhouette edge pixels.

Because we detect a transition, noise and secondary scattering can affect the accuracy of the position of the detected silhouette edge pixels, but always their presence.

There are a few conditions when a negative transition at a silhouette edge cannot be detected in the ratio image R(x), or when other conditions cause spurious transitions. The silhouettes can be missed due to detached shadows, low background albedo, holes and valleys, or when silhouettes lie in shadowed regions. Some pixels can be misclassified as silhouette edge pixels due to specularities, self-shadows, or view-dependent silhouettes.

There is a tradeoff in selecting the baseline between the camera's COP and the flash units. For a larger image width for shadow d, a larger baseline is better, but a smaller baseline avoids separation of shadows.

A width of a particular attached cast shadow in an image is $d=f(z_2-z_1)B/(z_1z_2)$, where f is the focal length, B is the baseline in mm, and $z_1$ and $z_2$ are depths, in mm, to the shadowing and shadowed edge.

The shadow separation occurs when a threshold width T of the object is smaller than $(z_2-z_1)\times B/z_2$. Therefore, a smaller baseline allows a smaller width T without shadow separation. Because the effective focal length can be increased using a higher resolution camera, we use a high-resolution camera with a very small baseline and large distance or 'depth' to the object ($z_2$).

Non-uniformity of lights sources can also affect the results. It affects $R_k(x)$ because ($\mu_k/\max_i(\mu_k)$) is not a constant. Fortunately, even with non-uniform light sources, the lobe intensity changes smoothly across the field, so it does not introduce spurious edges in $R_k$.

Detection of negative intensity steps leading into a shadow region is a binary decision, making our method robust to noise. However, light produced by the flash units still needs to override the ambient light. We also rely on the assumption that silhouettes are separated from the background with a finite depth, which implies we need a background.

Reducing Detail in Textured Regions

We also provide a procedure for reducing details or complexity in regions of images that are not associated with the silhouettes of a scene, such as texture and illumination variations. Given the silhouettes edge pixels 306, it is now possible to identify 230 pixels belonging to texture edges. Thus, textured regions can be identified. These pixels are independent of the direction of illumination. Texture edges are intensity edges in the maximum image $I_{max}$ minus the detected silhouette edges.

Ideally, we would like to identify all textured regions, i.e., sets of pixels corresponding to a texture detail in the original image, and de-emphasize the texture detail in the output image 201. However, although we can identify texture edges, we cannot reliably find all textured regions. This is because texture edges do not always form an enclosed contour around a textured region, due to gaps after silhouette edge detection, or because such regions can fade into dominant colors.

Therefore, we desire to perform a 'tunable' abstraction where, for example, geometric features can be given more importance, and texture features, e.g., edges and regions, can be de-emphasized. We also want to eliminate pixels that do not have the dominant colors.

One solution blurs regions associated with the texture edges. One could simply assign a weighted average of the colors of the neighboring featureless pixels to texture pixels and nearby pixels. However, that only diminishes the textured region boundaries and does not remove the gradients. Furthermore, the textured regions, delineated by texture edges, can be several pixels wide, and thus, are not completely eliminated. Another approach uses distance fields or diffusion type techniques.

Instead of pixel-level operations, we use an edge-based procedure.

Our edge-based procedure is based on the observation that high intensity gradients at texture pixels separate non-dominant color pixels from the dominant color pixels. If the image is reconstructed from gradients without the high gradients at texture pixels, then the non-dominant color pixels are automatically filled in smoothly by colors from the other side of the texture pixels. No decision needs to be made about what intensity values to use to fill in holes, and no feathering or blurring needs to be done, as is required with conventional pixel-based systems.

Figure 4:
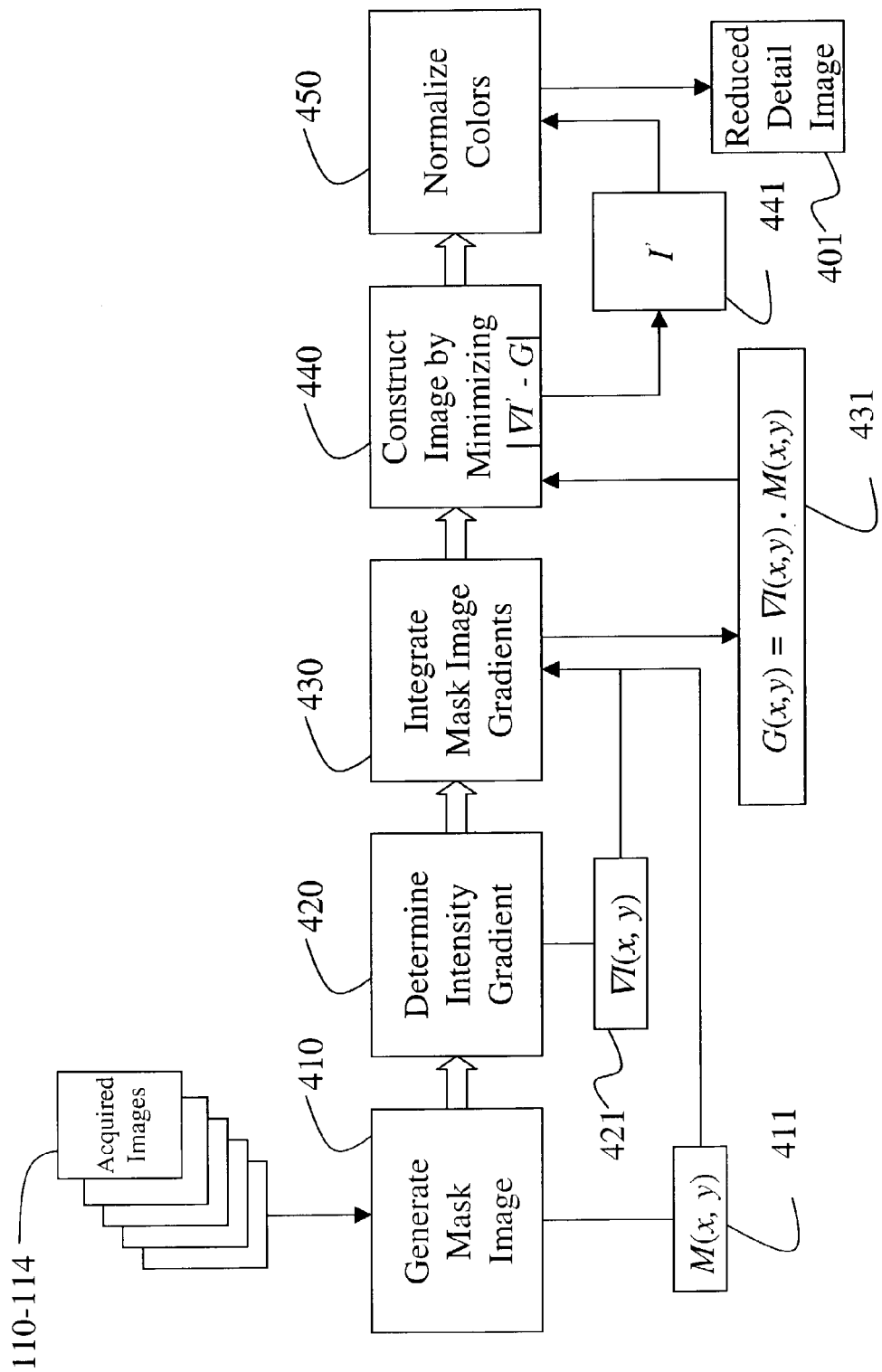
FIG. 4 is a flow diagram of a method for reducing detail in textured images.

FIG. 4 shows the steps of our rendering procedure 400. First, generate 410 a mask image M(x, y) 411 from the acquired images 1101–114. A starting point can be the maximum image overlaid with all the silhouette edge pixels. An intensity of a pixel (x, y) in the mask image M(x, y)

=0, if (x, y) is a texture edge pixel

=d(x, y), if (x, y) is a featureless pixel

=1, if (x, y) is a silhouette edge pixel.

The factor d(x, y) is a ratio of a distance field of the texture edge pixel and a distance field of the silhouette edge pixel.

Then, determine 420 intensity gradients $\nabla I(x, y)$ 421 in the mask image. Next, integrate 430 the gradients in the masked image according to $$G(x, y)=\nabla I(x, y)\cdot M(x, y) 431.$$

Construct 440 an image I'(x, y) 441 that minimizes |∇I'−G|, and normalize 450 colors in image I'(x, y) to substantially match the colors in the input image I(x, y).

For image reconstruction 440 from gradients fields, an approximate invertibility problem, we adapt a direct method described by Elder, "Are Edges Incomplete?" *International Journal of Computer Vision* 34, 2/3, pp. 97–122, 1999, and Fattal et al., "Gradient Domain High Dynamic Range Compression," *Proceedings of Siggraph*, ACM SIGGRAPH, 2002.

An estimate of the intensity function I', so that G=∇I, can be obtained by solving the Poisson differential equation ∇²=divG with a LaPlace operator and a divergence operator.

We use a full multigrid method to solve the LaPlace equation, see Press et al., "*Numerical Recipes in C: The Art of Scientific Computing*, Pearson Education, 1992.

At the border of the image, we specify boundary conditions to reduce image artifacts near the boundary. A natural choice is the Neumann condition ∇I.n=0, i.e., the derivative in the direction normal to the boundary is zero. This is clearly not true when high gradients are present near the image boundary. Therefore, we modify the image I', and pad it with colors obtained by applying a Gaussian filter to smooth boundary pixels. The constructed image I' is later cropped to its original size. Padding the border by five pixels is sufficient. Finally, we normalize 450 the image to obtain the color values in the reduced detail output image 401.

We assign and modify not just the luminance, but also texture. Therefore, we integrate 430 the masked gradients separately in each color channel. Without a consistent boundary condition (∇I.n=0), the scale and shift in the normalization would be significantly different.

Rendering

Color assignment

Image construction 440 from the gradient field involves a scale and shift ambiguity.

$$I'(x, y)=c_1 I'(x, y)+c_2.$$

We compute the unknowns, $c_1$ and $c_2$, in the least square sense, using a simple heuristics that demands that the overall appearance of the reconstructed image substantially matches the original image. Each pixel leads to a linear equation, $$I(x, y)=c_1 I'(x, y)+c_2.$$

If we operate on purely the luminance image and add back the chrominance, then the textures are not removed. In fact, there is no color space in which textures can be completely separated. Hence, we do image construction in all three color channels separately and determine the unknowns per channel.

Because of the boundary condition (∇I.n=0), the scale and shift in the three channels do not introduce noticeable artifacts.

Edge Enhancement

Our procedure to detect silhouette edge pixels also generates additional useful information that can be used for image enhancement.

The width of a shadow $d=f(z_2-z_1)B/(z_1 z_2)$, is proportional to a depth difference $(z_2-z_1)$ at the depth discontinuity. This information can be used during image enhancement.

At a silhouette edge, we can determine which side of the silhouette belongs to the foreground and which side belongs to the background. The calculation is based on which side of the edge has a higher intensity in the $R_k$ image at the negative transition along the epipolar line.

This qualitative depth relationship can also be used for edge enhancement. We first generate a silhouette image, where silhouettes are in white on a black background. We convolve with a filter that is the gradient of an edge enhancement filter. We use a Gaussian filter minus an impulse function. When we integrate the convolved image, we obtain sharp transition at the silhouette edges.

Comparison with the Prior Art

Better lighting could be used to improve contrast and highlight objects with respect to the background. While the success of this approach generally depends on the skill of the photographer, we provide a general solution with clear geometric basis. In addition, because the light sources are close to the camera's COP, our single self-sufficient camera 100 does not require external light sources, simplifying the set up.

A second simple option is to perform edge-detection on the intensity image. However, sharp changes in image values do not necessarily imply object boundaries, and vice versa. For example, a complex scene can generate many spurious intensity edges, while in a simple image very few intensity edges are detected. Hence, image enhancement strategies that rely on examining image value changes alone often fail. Previous NPR techniques that work on a single image rely on very high quality, good contrast images so that intensity edges detection and color segmentation are reliable.

Our approach may appear to be similar to active illumination techniques, such as traditional stereo, photometric stereo and Helmholtz stereo. However, depth discontinuities present difficulties for a traditional stereo technique. Stereo techniques often fails due to half-occlusions, which confuse the matching process.

Photometric stereo simultaneously estimates geometry and albedo across a scene. The main limitation of classical photometric stereo is that the light sources must be far apart from the camera's COP, and the positions of the light sources must accurately known. This requires a fixed lighting rig as might be possible in an studio, industrial or laboratory setting, but not in a self-contained camera unit. Furthermore, that approach relies on detecting normals along smooth surfaces, and fails at depth discontinuities, shadowed regions and half-occluded sections. Our approach is exactly opposite, and takes binary decisions for intensity variations at a scene depth discontinuity.

For Helmholtz stereo, shadowed and half-occluded regions are in correspondence. A surface in a shadow in a left image is not visible in the right image, and vice versa. The problem is that computing shadowed region in a single image is a difficult problem. The only reliable way to classify a pixel to be in shadow region is to compare it with yet another pixel when it is not in the shadow. This binary decision makes our technique robust. We also do not rely on any matching or correlation process, and most operations can be done on a per pixel basis. This enables us to integrate the entire method in the camera's microprocessor.

Enhancing Images of Natural Uncontrolled Illuminated Scenes

In addition to making use of controlled illumination, we can also enhance images taken of scenes with naturally changing illumination. By naturally uncontrolled illumination, we mean that both the direction and intensity of illumination is uncontrolled.

It is often difficult to interpret a low quality image due to dark or hazy areas, e.g., in nighttime or foggy scenes, low-resolution, or noisy images. Our idea is to enhance these low quality images by providing context using other high quality images acquired of the scene with better illumination, e.g., under daylight. Providing context can be useful for both static and dynamic scenes.

Static Scenes

When the geometry of a scene remains constant but for the changes in illumination, the context can clarify the scene and identify areas of interest. For example, a low quality nighttime image of a scene can be enhanced by combining it with a high quality daytime image of the same scene.

Dynamic Scenes

More interesting applications are when there is a change in scene geometry over time. Using a notion of a static background and a dynamic foreground, we can provide a context of an action or event. The dynamic scene component can be captured in still images or a video.

Some example applications where our image enhancement method can be used include surveillance, e.g., determining the part of a building near where a person is standing, determining what a person's hand is hiding, identifying reflections in dark areas, e.g., headlights reflecting from windows of dark buildings, or identifying a blinking light at night.

There are two possible types of enhancements, symmetric and biased. In the symmetric enhancement, all images are treated as having the same quality, and all "interesting" pixels from all images are used during the enhancement process. In the biased enhancement, the high quality reference image that is used to improve the quality of the low quality images is identified explicitly, and more importance in the lower quality images are retained even when more important features appear in the high quality reference image.

The problem reduces to how best to combine important information from two or more images. Our approach is based on two heuristics. First we retain pixels from each image that appear to be locally important depending on the specified bias. Second, to maintain intra-image coherence, we provide context to pixels in the images. Note, we do not improve the quality of individual pixels themselves, but simply give sufficient context to improve human interpretation of the images.

Hence, any conventional techniques, such as contrast enhancement, histogram equalization, mixed Gaussian models for background estimation are orthogonal to our approach, see Toyama et al., "Wallflower: Principles and Practice of Background Maintenance," ICCV (1), pp. 255–261, 1999. However, those techniques could be applied in a post processing step to further improve the final result.

We build our results on the basic observation that if the camera and viewed geometry remain static, only illumination and minor parts of the scene change, e.g., moving subjects like people, devices, vehicles, so it is possible to collect information over time.

Figure 5:
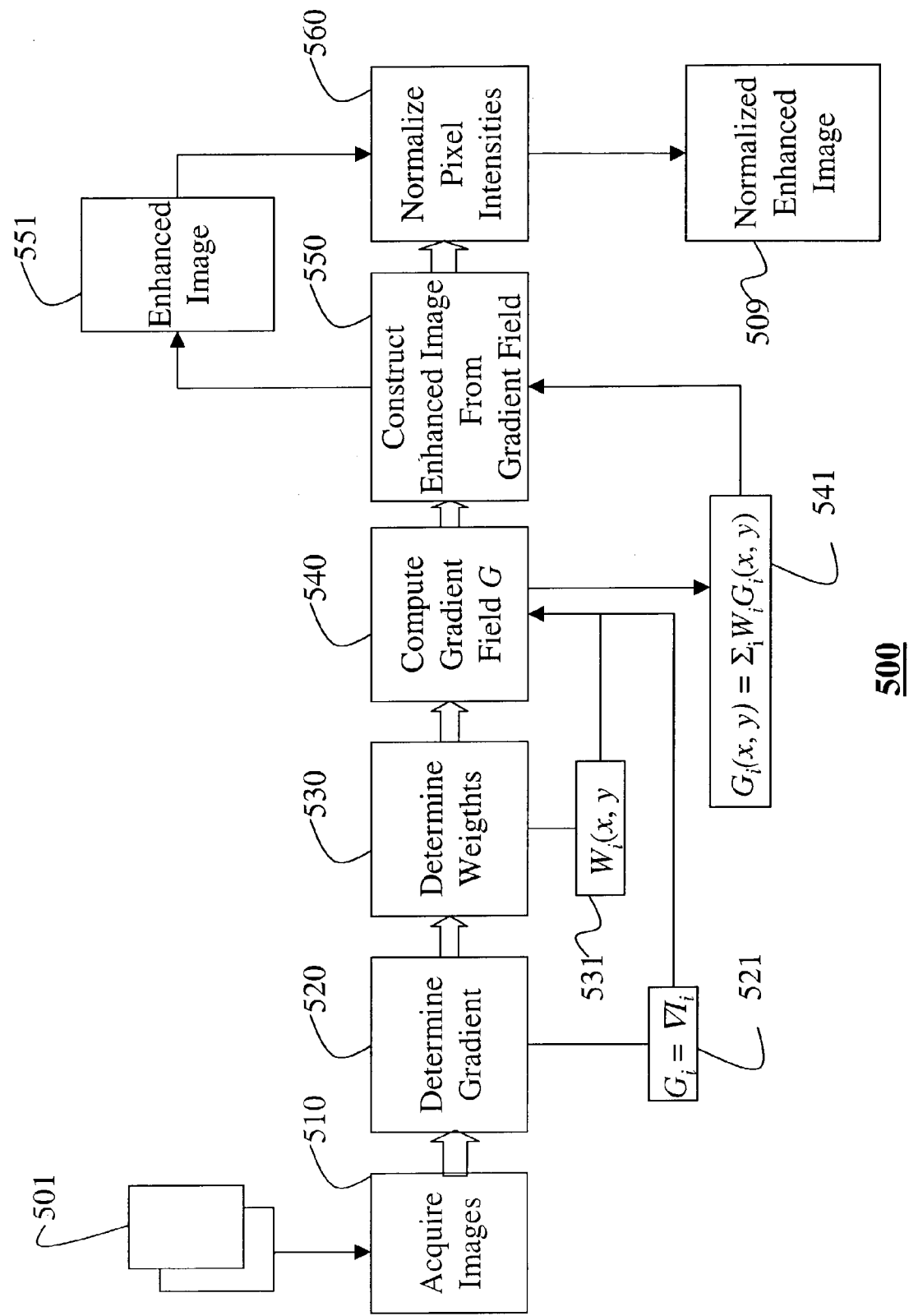
FIG. 5 is a flow diagram of a method for enhancing the quality of images acquired of a scene according to the invention.

FIG. 5 shows the steps of our method 500 for enhancing the quality of images acquired of a scene. First images $I_n$ 501, for I=1, ..., n are acquired 510 of the scene. The images are acquired with different intensities and directions of illumination so that some images have a high quality, and other images have a low quality. For example, some of the images are taken under daylight, while other images are taken at night.

For each input image, determine 520 the intensity gradients 521 of the pixels according to $G_i = \nabla I_i$, for I=1, ..., n.

Next, weights $W_i(x, y)$ 531 are determined 530 for each pixel in each image. The weights correspond to the importance of various portions of the images. The weights are multiplied by the gradients and summed 540 over all images according to $G(x, y) = \Sigma_i W_i G_i(x, y)$ to determine a gradient field G. Then, an enhanced image 1 551 is constructed 550 from the gradient field G, and the pixel intensities in the enhanced image 551 are normalize 560 to obtain the final output normalized enhanced image 509.

The weights $W_i(x, y)$ 531 can be determined in several ways depending on the application. Our basic idea relies on the widely accepted assumptions that the human visual system is not very sensitive to absolute luminance reaching the retina, but rather responds to changes in ratios of local intensities.

Therefore, our importance weights are based on spatial intensity gradients in images. For a video, temporal intensity gradients can also be considered. We first generate a weighting image to encode the importance that combines the gradients from day and night images. This is a mixed-gradient image. By integrating this mixed-gradient image, we can construct the enhanced image that preserves local importance in both images. Because gradient field integration involves computing a smooth integral, we automatically get a gradual transition between the source images.

The weights $W_i(x, y)$ encode the importance of a pixel in an image and ensure intra-frame coherence. Let us consider some symmetric approaches. A binary 0 or 1 weight $W_i(x, y)$ can be assigned by checking which image has the maximum variance at pixel (x, y). Normalized value in the range [0,1] can be assigned, based on the weighted average of the variance of the source images.

For intra-frame coherence, we multiply by a weighted distance field of a binary image obtained by thresholding high variance regions. For biased approaches the weights are scaled by a scalar $B_i$, i.e., the bias of each image.

We provide a practical method for improving a low-quality night-time image by combining it with a high-quality day-time image of a scene. This idea appears to be very simple in retrospect. So far, this idea has not been used for non-photorealistic image synthesis.

A naïve approach to automatically combining a daytime and nighttime picture would be to use a pure pixel substitution method based on some importance measure. This works well only when the source images are almost identical, e.g., two images of the same scene with different focus.

Similarly, blending strategies such as $\max_i(I_i(x, y))$ or $\text{average}_i(I_i(x, y))$ also cause problems. For example, when combining day and night images, one needs to deal with the high variance in the day-time images and with mostly low contrast and patches of high contrast in night-time images. Taking the average simply overwhelms the subtle details in the nighttime image, and presents 'ghosting' artifacts around areas that are bright at nighttime. Furthermore, juxtaposing or blending pixels usually leads to visible artifacts, e.g., sudden jumps from dark night pixels to bright day pixels, which distract from the subtle information conveyed in the night images.

Low-Quality Video Enhancement

Providing context to captured events and actions can enhance low quality videos. The context, as described above, comes from higher quality images. Videos, however, present several additional challenges: inter-frame coherence must be maintained, i.e., the weights in successive images should vary smoothly; and a pixel from a low quality image may be important even where the local variance is small, e.g., the area between the headlights and the taillights of a moving car.

Our solution is based on the simple observation that moving objects span approximately the same pixels from front to back, with respect to the direction of travel. For example, the front profile of a moving car covers all the pixels that will be covered by rest of the car in subsequent frames, until the back of the car is reached. Although the moving object may not show enough intra-frame or inter-frame variance, we maintain the importance weight high for a large interval after the front of the object, using temporal hysteresis.

The importance, based on the spatial and temporal variation and the hysteresis at a pixel is encoded in weights $W^j(x, y)$ for each frame j.

Just as in the case for static images, a good quality video segmentation or optical flow technique could improve our results. Here, we intentionally use a very simple technique, i.e., pixel-wise differences, to demonstrate that our technique does not need to rely completely on complicated optical flow or image change detection techniques.

Figure 6:
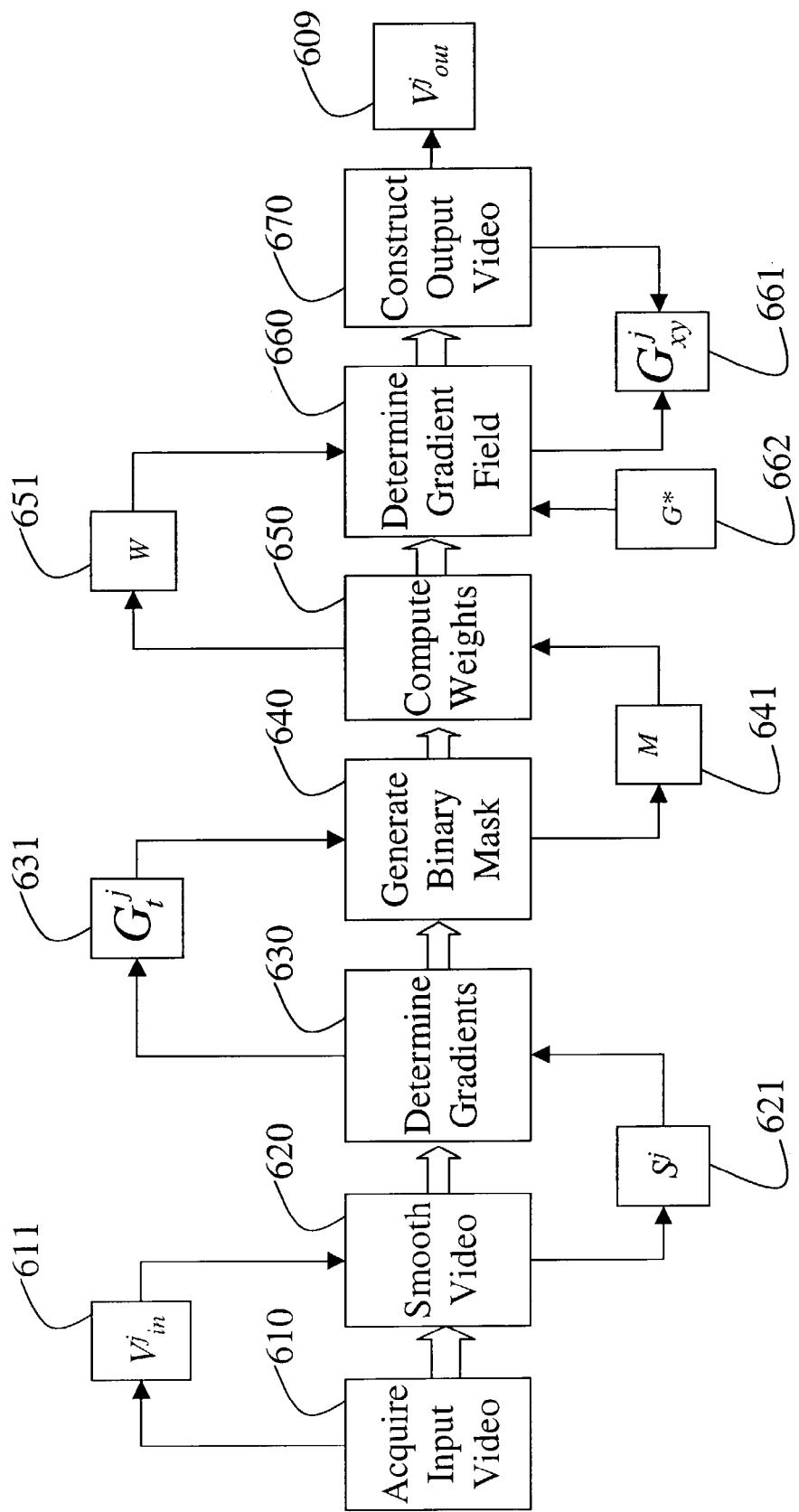
FIG. 6 is a flow diagram of a method for enhancing the quality of a video acquired under uncontrolled illumination according to the invention.

FIG. 6 shows the steps of our method 600 for enhancing the quality of a video acquired under uncontrolled illumination. First, acquire 610 an input video $V^j$ 611 of a scene under uncontrolled illumination. Next, smooth 620 the input video into a noise-reduced video $S^j$ 621, and determine 630 gradients $G_t^j(x, y)$ 631 for each frame j of the smoothed video. A binary mask $M^j(x, y)$ 641 is determined 640 by thresholding the gradients $G_t^j(x, y)$ 631, and weights 651 are determined 650 for the binary mask according to $$W^j(x, y) = F(M^k(x, y), k=j-c:j+c,$$

where c is a temporal extent, e.g., ten frames in each direction.

Then, for each frame j, if $W^j(x, y) > 0$, a gradient field is computed 660 as $$G_{xy}^j(x, y) = W^j(x, y)G_{xy}^j(x, y) + (1-W^j(x, y))G^*_{xy}(x, y),$$
else $$G_{xy}^j(x, y) = (1-W^j(x, y))\max(S_{xy}^j(x, y), G^*_{xy}(x, y)),$$

where $G^*_{xy}$ 662 are the gradients in a single high-quality image acquired from the scene under 'ideal' illumination.

Now, frames of the output video $V^j_{out}$ 609 can be constructed 670 from the gradient field $G_{xy}^j$.

The noise reduced video S is generated by applying edge-preserving bilateral filtering in space and time to the frames of the input video.

The temporal gradient at a pixel (x, y) is $G_t^j(x, y) = S^j(x, y) - S^{j-1}(x, y)$, i.e., a difference between a current and previous frame of the noise-reduced video.

The spatial gradient $G_{xy}^j(x, y) = (V^j(x, y) - V^{j-1}(x-1, y), V^j(x, y) - V^{j-1}(x, y-1))$ is calculated from the original video to maintain the detail.

A weight $W^j(x, y)$ is computed by applying a distance field to the binary mask values $\{M^k(x, y)\}$, k=j-c: j+c. This achieves temporal coherence for assigned weights. We select the extent of influence, c, to be ten frames in each direction.

Finally, we use the computed weights to combine the spatial gradients from each frame with the spatial gradients, $G^{*xy}$ of a high quality image $I^*$. If the weight due to temporal variation is zero, then we revert back to pure image gradient comparison. Note, we use the gradient from a smoothed frame $S^i$ to avoid accentuating intra-frame noise.

For a practical implementation we used a 3D Susan filter, i.e., a 3×3×5 neighborhood, with σ=15 and τ=20. The high-quality static image is obtained by median filtering a day time video.

Other Applications

The edge classification procedure according to the invention can also improve edge-based and area-based stereo correspondences. Matching of edges is improved when silhouette edges are properly matched. Area-based techniques work poorly due to partial occlusion, but such problematic areas can be detected. Edge classification can also assist color and texture segmentation techniques even in low-contrast images, which in turn can be used for layer extraction and image compression.

The silhouette edge detection can also be used in computer vision and image processing applications such as stereo reconstruction, visual hull construction, face recognition, and an initial step for technical illustration and cartoons.

It should be noted that our silhouette extraction scheme can also be used for other images that have similar 'shadow' problems, for example, images taken with infrared cameras, laser range scanners, and radar.

Our video enhancement scheme is ideal for video surveillance application. Sophisticated prior art schemes try to analyze the image in order to detect and display significant events. In contrast, our approach is simple. We provide the viewer with tunable density of information.

Effect of the Invention

The invention provides novel techniques for extracting useful information from multiple images of scenes by exploiting their illumination-dependent properties. The invention has been described in terms of basic prototypes, related procedures for edge enhancement, image processing and video processing.

By removing extraneous details, the invention can clarify a geometrically complex or low contrast scene. By providing context to dark or low quality images or videos, the invention can generate more useful images and better video surveillance. Our techniques can easily be implemented in software.

Alternatively, the methods described herein can be implemented with hardware inside a single camera. By performing 'one-pixel-at-a-time' processing on acquired images, the camera can directly output stylized images.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for enhancing images of a naturally illuminated scene, comprising:
   acquiring a plurality of images $I_i(x, y)$ of a scene, each image having a different uncontrolled illumination;
   determining, for each image $I_i(x, y)$, intensity gradients according to $Gi(X, Y) = \nabla I_i(x, y)$;
   determining, for each image $Ii(X, Y)$, weights $Wi(X, Y)$;
   determining a gradient field $G(X, Y)$ from a weighted sum of the weights multiplied by the intensity gradients according to $G(X, Y) = E_i WiGi(X, Y)$; constructing an enhanced image I' from the gradient field; and normalizing pixel intensities in the enhanced image.

2. The method of claim 1 wherein the scene is static.

3. The method of claim 1 wherein the scene is dynamic.

4. The method of claim 1 wherein intensities and directions of the illumination are uncontrolled.

5. The method of claim 1 wherein the weights are based on spatial intensity gradients.

6. The method of claim 5 wherein the weights are based on temporal intensity gradients.

7. The method of claim 1 wherein each weight is either zero or one.

8. The method of claim 1 wherein the weighs are normalized in a range zero to one.

9. The method of claim 1 wherein a first image of the scene is acquired during daytime, and a second image of the scene is acquired during nighttime.

10. The method of claim 9 further comprising:
weighting the first image according to intensity gradients of the first image; and
weighting the second image according to intensity gradients of the second image.

11. The method of claim 10 wherein weights for the weighting are based on spatial intensity gradients.

12. The method of claim 10 wherein weights for the weighting are based on temporal intensity gradients.

13. The method of claim 10, further comprising:
normalizing weight for the weighting.

14. The method of claim 9, further comprising:
normalizing pixel intensifies in the enhanced image.

15. The method of claim 1 wherein a direction and intensity of the illumination is uncontrolled.

16. The method of claim 1 wherein the different illumination for each image is due to weather conditions.

17. The method of claim 1 wherein the different illumination for each image is due to a time of day.

18. The method of claim 1 wherein the combining treats the plurality of images equally.

19. The method of claim 1 wherein the combining treats the plurality of images unequally.

20. The method of claim 19 wherein a first image is a low resolution of the scene, and a second image is a high resolution image of the scene, and the combining enhances a quality of the first image.

21. The method of claim 1 wherein the combining further comprises:
retaining, for each image, only pixels appearing locally important based on a specific bias.

22. The method of claim 1 wherein the combining further comprises:
maintaining an intra-image coherence to provide a context to pixels in the enhanced image.

23. The method of claim 1 wherein the plurality of images are acquired with different focuses.

24. The method of claim 1 wherein the illumination is infrared radiation.

25. The method of claim 1 wherein the illumination is laser radiation.

26. The method of claim 1 wherein the illumination is radar.

* * * * *